(12) United States Patent
McWhorter

(10) Patent No.: US 8,454,900 B2
(45) Date of Patent: Jun. 4, 2013

(54) ALKALINE METAL FUEL PULSE GENERATOR

(76) Inventor: Edward Milton McWhorter, Citrus Heights, CA (US)

( * ) Notice: Subject to any disclaimer, the term of this patent is extended or adjusted under 35 U.S.C. 154(b) by 467 days.

(21) Appl. No.: 12/806,834

(22) Filed: Aug. 23, 2010

(65) Prior Publication Data

US 2011/0081279 A1    Apr. 7, 2011

(51) Int. Cl.
*B01J 19/00*   (2006.01)

(52) U.S. Cl.
USPC .................................. 422/224; 48/61; 91/472

(58) Field of Classification Search
USPC ................................... 422/224; 48/61; 91/472
See application file for complete search history.

(56) References Cited

U.S. PATENT DOCUMENTS

| | | | | |
|---|---|---|---|---|
| 2,101,829 A | * | 12/1937 | Benedek | 91/498 |
| 2,126,722 A | * | 8/1938 | Benedek | 91/489 |
| 3,730,776 A | * | 5/1973 | Geisler, Jr. | 429/51 |
| 3,744,378 A | * | 7/1973 | Douglas | 91/484 |

* cited by examiner

*Primary Examiner* — Jill Warden
*Assistant Examiner* — Huy-Tram Nguyen

(57) ABSTRACT

A method of dispensing small discrete quantities of fluidized alkaline metals fuels through a plurality of spindle shaft orifices into a hydrolyzation chamber at a high spindle shaft rotational speed.

1 Claim, 1 Drawing Sheet

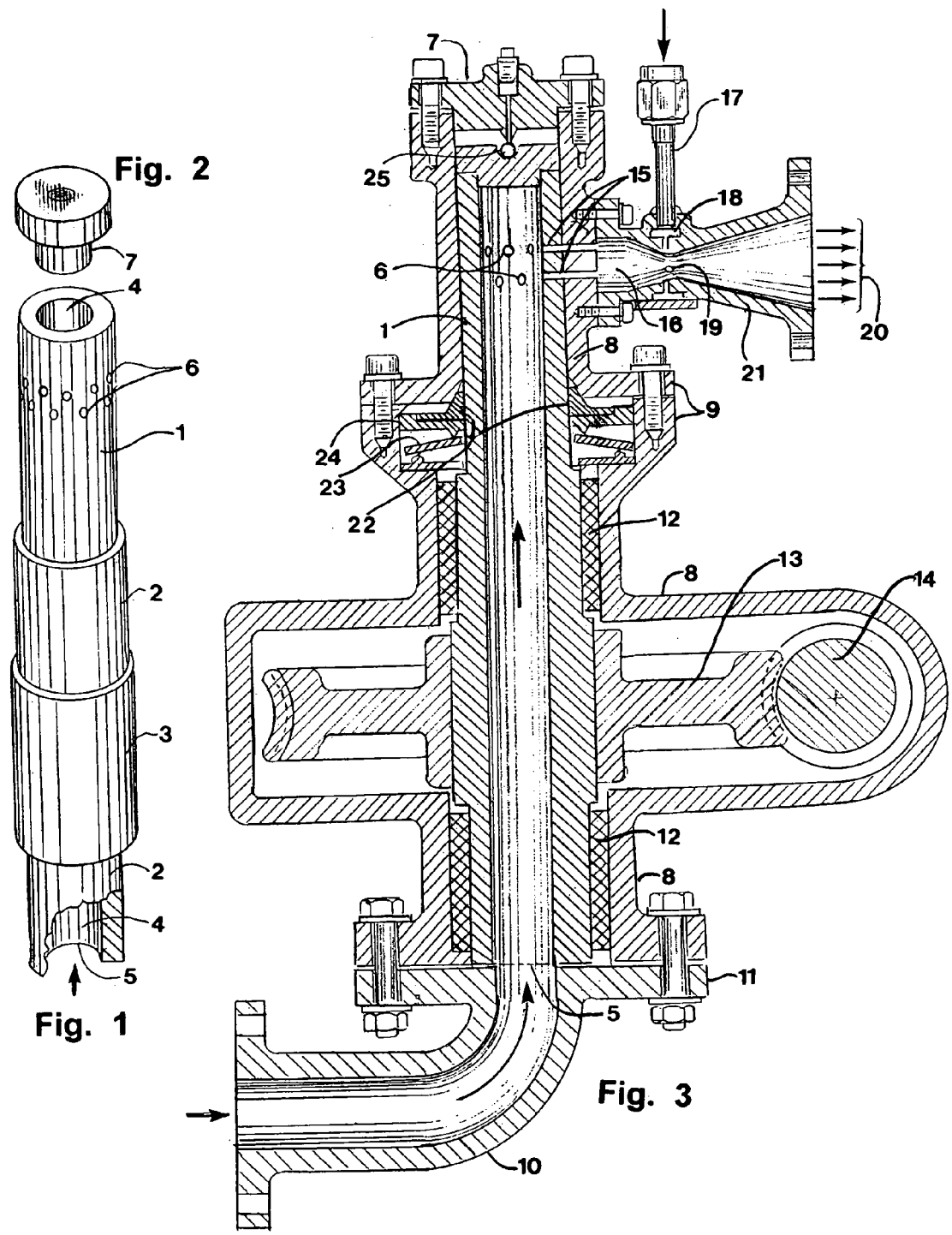

ALKALINE METAL FUEL PULSE GENERATOR

CROSS REFERENCES

Ref. 1. U.S. patent application Ser. No. 12/587,102 filed Oct. 2, 2009
Direct Current Simplex Generator

BACKGROUND OF THE INVENTION

The design is a dispenser system which is used to deliver small discrete quantities of fluidized potassium and sodium alkaline metals and alkaline earth metal alloys of these said metals at 60 hz cyclic intervals into a hydrolyzation chamber where they are reacted in a water spray. In the hydrolyzation reaction the said alkaline metals and alkaline earth metals are converted by oxidation to their hydroxides [$NaOH$, $KOH$, $Ca(OH)_2$, $Mg(OH)_2$] in chemical reactive proportions to their established empirical formula, and also liberating protons ($H^+$) and electrons ($e^-$) from the water molecules. The exothermic reactions produce a gaseous ionic mixture which passes out of the reaction chamber into a capacitor tuyere, described in Ref. 1 where the electrons are removed and the said gaseous ionic flow passes out of the capacitor tuyere as positively charged ionic particles to be used in chemical synthesis. The electrons generated in the hydrolyzation chamber are captured in the said capacitor tuyere at discrete 60 hz pulses and are used as an electrical generator power source delivering 60 hz direct current pulses. Because current flow is pulsed in the same direction and does not alternate direction there are no hysteresis transformer losses. The rate at which the capacitors of the said capacitor tuyere release the static charge of captured electrons removed from the said hydrolyzation chamber ionic flow into the inductance circuits of primary windings of transformers the generating power is higher than that produced by wire wound armatures cutting a magnetic field.

The earliest designs for dispensing alkaline metals in the reduced solid state into a hydrolization chamber began as dispersions of metal particulates in heavy based petroleum carrier fluids. This method of dispensing metals in the dispersed phase created an undesirable carbonaceous by-product residue. The use of solid state calcium nodular sodium flocculant rolled in thin foil sheets placed on a conductor/insulation carrier tape is presently considered as a transportation fuel in a solid fuel diffusion fuel cell for charging storage batteries and circuit ballast batteries of electrical vehicles while the said vehicle is moving. In larger electrical generation system and in larger commercial chemical production facilities alkaline metals are fluidized and used as reactants to be dispensed in their liquid state as reactants in hydrolyzation chambers. Alloys of potassium and sodium are produced as alloys in the liquid state at room temperature. When these metals are used separately in their individual heated state at elevated melting point temperatures which are only slightly lower than the boiling point of water, the method of dispensing these fluidized alkaline metals to the said hydrolyzation chamber is only marginally effected. The relative melting point of sodium is 207° F. while that of potassium is 147° F. When the two metals are alloyed the melting point of the alloy is lowered to a point below ambient room temperature such that they are present in the liquid state. The present dispenser system is designed to operate at temperatures which are lower than the bearing temperatures of internal combustion engines.

The ability to mechanically pulse the dispensing of discrete quantities of alkaline metals for the generation of a 60 hz oscillatory direct current (DC) without employing an electronic inverter illustrates the cost effective efficiency of the present dispensing system. In Ref. 1 the spindle shaft has only one (1) orifice and produces only 1 hz at 30 rpm rotation of the spindle shaft and an electronic switching circuit is used to produce 60 hz pulses. The present spindle shaft has 24 orifices and rotates at 150 rpm producing 3600 cycles of opening and closing flow of fluidized alkaline metal to the hydrolyzation chamber in one minute to generate a pulsed direct current oscillation of 60 hz.

(24 orifices×150 rpm/60 sec=60 hz)

The number of orifices of the present invention compared to the system of Ref. 1 is increased from one (1) to twenty four (24) and the spindle shaft rotational speed is increased from 30 rpm to 150 rpm. The higher rotative speed is without need of bearing lubrication using bronze graphite self lubricating bearings.

The spindle shaft orifice valving of the invention is mounted on a worm gear and rotates at the same rate as the said worm gear. A high speed electrical motor is used to turn the driving worm. The principal advantage of worm gearing is its ability to transmit power at high velocity ratios for reduction of spindle shaft speed. Worm gearing is more mechanically reliable than spur or bevel gearing in this application. The combination of high speed electrical motor and fast reduction of spindle shaft rotational speed more effectively accommodates the high torque and fluid flow resistances in the dispensing of fluidized alkaline metals in small discrete proportional quantities.

SUMMARY OF THE INVENTION

The invention is a spindle shaft which comprises multiple orifices to increase the rate of delivery and high cyclic injection of discrete proportional quantities of alkaline metals into a hydrolyzation chamber.

An object of the invention is to generate electrons by the dissociation of water molecules to generate a 60 hz pulsing DC current flow.

Another object of the invention is to produce gaseous positively charged particles for the synthesis of calcium cyanimide when reacted with flue gas $CO_2$ molecules.

Still another object of the invention is to provide a positive ionic fluid from the hydrolyzation products of sodium to form dicarboxylic acid from coal flue gas emissions.

BRIEF DESCRIPTION OF THE DRAWINGS

FIG. 1 is an isometric view of the multiple orifice spindle shaft shown in partial cross-section and illustrates the use of the shaft centered flow passage and two levels of radial aligned orifices.

FIG. 2 is an isometric view of a plug which is furnace brazed at the top of the said spindle shaft.

FIG. 3 is a cross-sectional view illustrating how the multiple orifice spindle shaft interfaces with corresponding synergistic elements of the associated flow delivery of the dispensing mechanism.

DETAILED DESCRIPTION OF THE INVENTION

FIG. 1 is a rotatively mounted multiple orifice spindle shaft, hereinafter referred to as spindle shaft 1. Spindle shaft 1 comprises two sleeve bearing surfaces 2, a worm gear mounting surface 3, and a bored center 4 flow passage of constant diameter along its full length. Fluidized alkaline metal fuel enters the said center bore 4 at inlet 5. Two vertical levels of equal radially spaced orifices 6 positioned at 30 degree intervals are drilled through spindle shaft 1 into center bore 4 at both said vertical levels such that there are twenty four orifices total. The two levels of orifices are vertically offset 15° from each other such that flow from each orifice 6 occurs as a singular event for each one revolution of spindle shaft 1. Thus for each rotation of spindle shaft 1 there are 24 singular openings and closings of flow from center bore 4.

FIG. 2 is a plug 7 which is fitted into center bore 4 of spindle shaft 1 and furnace brazed.

Turning now to FIG. 3 which is a cross-section of the pulse generator mechanism. Spindle shaft 1 is rotatively mounted in dispenser gearing housing 8 comprising two castings bolted together at flange 9. A fuel circuit inlet fitting 10 is fixedly attached to housing 8 by flange 11 bolted to housing 8. Spindle shaft 1 rotates on two self lubricating bronze bearings 12 positioned on each side of gear mounting surface 3. Worm gear 13 is engaged and turned by worm 14. Two stationary orifices 15 are drilled into housing 8 at vertically aligned positions at the same height as the two radial levels of orifices 6 such that each stationary orifice 15 is alternately opened and closed by rotation of pintle shaft 1 bringing the fluidized metal flow in center bore 4 into communication with hydrolyzation chamber 16. Water line 17 carries water into water manifold 18 which is sprayed into hydrolyzation chamber 16 through small orifice apertures 17. The hydrolyzation of the alkaline metals in hydrolyzation chamber 16 is kinetically vigorous and highly exothermic and carries the ionic gaseous reaction products 20 at high velocity out of expansion nozzle 21 into a capacitor tuyere described in Ref. 1.

Other less important features of the invention are presented in FIG. 3 to illustrate means. A spindle shaft seal 22 is tightly pressed against spindle shaft 1 by a compression load placed on a cone disc (Belleville) spring 23 pushing against pressure disc 24. Static pressure of fluidized alkaline metal fuel in center bore 4 bears against the exposed surface of plug 7 pushing plug 7 upwards against shaft vertical spacing bearing 25. During storage or during non-operative periods spindle shaft 1 is held in position by worm 14 bearing against worm gear 13 hollow engagement surfaces.

NUMBERED ELEMENTS OF THE DRAWINGS

1. Spindle shaft
2. Bearing surfaces
3. Gear mounting surface
4. Center bore
5. Inlet
6. Orifices (24 places)
7. Plug
8. Housing (2 places)
9. Flange
10. Inlet fitting
11. Flange
12. Bronze bearing
13. Worm gear
14. Worm
15. Stationary orifices
16. Hydrolyzation chamber
17. Water line
18. Water manifold
19. Aperture
20. Reaction products
21. Expansion nozzle
22. Seal
23. Cone disc spring
24. Pressure disc
25. Spacing bearing

What is claimed is:

1. A pintle shaft rotatively mounted in a housing, said pintle shaft rotated by gearing, said pintle shaft having a center bore passage sealed at one end by a plug, said pintle shaft having two vertical levels of radial positioned and equally spaced orifices at 30° intervals, the said two vertical levels of said radial positioned orifices being radially offset at 15° degrees in vertical alignment, said housing having two stationary orifices vertically aligned at the same height as the said two vertical levels of said pintle shaft orifices such that one revolution of said pintle shaft opens and closes each said stationary orifice twelve times at evenly spaced intervals in alternate succession placing said center bore passage in communication with a hydrolyzation chamber twenty four (24) times for each complete revolution of said pintle shaft allowing evenly spaced intervals of small discrete quantities of alkaline metal fuel to pass into said hydrolyzation chamber at a cyclic rate of 60 hz, a water inlet into a water manifold in said hydrolyzation chamber, said water manifold having small orifice apertures for spraying water into said hydrolyzation chamber, said water spray coming into contact with said small discrete quantities of metals, said contact resulting in vigorous kinetic and exothermic chemical reactions forming reaction products passing into an expansion nozzle for cooling and lowering of the fluid stream density of said ionic reaction products for further processing.

* * * * *